(12) United States Patent
Farjadrad et al.

(10) Patent No.: US 12,182,040 B1
(45) Date of Patent: Dec. 31, 2024

(54) MULTI-CHIP MODULE (MCM) WITH SCALABLE HIGH BANDWIDTH MEMORY

(71) Applicant: Eliyan Corporation, Santa Clara, CA (US)

(72) Inventors: Ramin Farjadrad, Los Altos, CA (US); Syrus Ziai, Los Altos, CA (US); Curtis McAllister, Los Altos, CA (US); Kevin Donnelly, Santa Cruz, CA (US)

(73) Assignee: Eliyan Corporation, Santa Clara, CA (US)

( * ) Notice: Subject to any disclaimer, the term of this patent is extended or adjusted under 35 U.S.C. 154(b) by 0 days.

(21) Appl. No.: 18/230,089

(22) Filed: Aug. 3, 2023

Related U.S. Application Data

(60) Provisional application No. 63/471,234, filed on Jun. 5, 2023.

(51) Int. Cl.
  *G06F 13/42* (2006.01)
  *G06F 13/16* (2006.01)

(52) U.S. Cl.
  CPC ...... *G06F 13/1678* (2013.01); *G06F 13/1673* (2013.01); *G06F 13/4247* (2013.01)

(58) Field of Classification Search
  None
  See application file for complete search history.

(56) References Cited

U.S. PATENT DOCUMENTS

| | | |
|---|---|---|
| 4,334,305 A | 6/1982 | Girardi |
| 5,396,581 A | 3/1995 | Mashiko |
| 5,677,569 A | 10/1997 | Choi |
| 5,892,287 A | 4/1999 | Hoffman |
| 5,910,010 A | 6/1999 | Nishizawa |
| 6,031,729 A | 2/2000 | Berkely |
| 6,055,235 A | 4/2000 | Blanc |
| 6,417,737 B1 | 7/2002 | Moloudi |

(Continued)

OTHER PUBLICATIONS

Farjadrad et al., "A Bunch of Wires (BOW) Interface for Inter-Chiplet Communication", 2019 IEEE Symposium on High-Performance Interconnects (HOTI), pp. 27-30, Oct. 2019.

(Continued)

*Primary Examiner* — Elias Mamo
(74) *Attorney, Agent, or Firm* — Lance Kreisman; Peninsula Patent Group

(57) ABSTRACT

Semiconductor devices, packaging architectures and associated methods are disclosed. In one embodiment, a multi-chip module (MCM) is disclosed. The MCM includes a package substrate and an integrated circuit (IC) processor chip disposed on the package substrate. The IC processor chip includes a data interface configured to support N channels. A scalable high bandwidth memory (HBM) is coupled to the IC processor chip. The scalable HBM includes a first HBM device disposed on the package substrate with a first primary data interface that supports a first set of N/2 data channels and a first data transfer rate. A second HBM device is disposed on the package substrate and supports a second set of N/2 data channels and a second data transfer rate. The first HBM device and the second HBM device are configured to collectively support the full N channels and an aggregate data rate that is a sum of the first data rate and the second data rate.

18 Claims, 7 Drawing Sheets

(56) References Cited

U.S. PATENT DOCUMENTS

| | | | |
|---|---|---|---|
| 6,492,727 | B2 | 12/2002 | Nishizawa |
| 6,690,742 | B2 | 2/2004 | Chan |
| 6,721,313 | B1 | 4/2004 | Van Duyne |
| 6,932,618 | B1 | 8/2005 | Nelson |
| 7,027,529 | B1 | 4/2006 | Ohishi |
| 7,248,890 | B1 | 7/2007 | Raghavan |
| 7,269,212 | B1 | 9/2007 | Chau |
| 7,477,615 | B2 | 1/2009 | Oshita |
| 7,535,958 | B2 | 5/2009 | Best |
| 7,593,271 | B2 | 9/2009 | Ong |
| 7,701,957 | B1 | 4/2010 | Bicknell |
| 7,907,469 | B2 | 3/2011 | Sohn et al. |
| 7,978,754 | B2 | 7/2011 | Yeung |
| 8,004,330 | B1 | 8/2011 | Acimovic |
| 8,024,142 | B1 | 9/2011 | Gagnon |
| 8,121,541 | B2 | 2/2012 | Rofougaran |
| 8,176,238 | B2 | 5/2012 | Yu et al. |
| 8,468,381 | B2 | 6/2013 | Jones |
| 8,483,579 | B2 | 7/2013 | Fukuda |
| 8,546,955 | B1 | 10/2013 | Wu |
| 8,704,364 | B2 | 4/2014 | Banijamali et al. |
| 8,861,573 | B2 | 10/2014 | Chu |
| 8,948,203 | B1 | 2/2015 | Nolan |
| 8,982,905 | B2 | 3/2015 | Kamble |
| 9,088,334 | B2 | 7/2015 | Chakraborty |
| 9,106,229 | B1 | 8/2015 | Hutton |
| 9,129,935 | B1 | 9/2015 | Chandrasekar |
| 9,294,313 | B2 | 3/2016 | Prokop |
| 9,349,707 | B1 | 5/2016 | Sun |
| 9,379,878 | B1 | 6/2016 | Lugthart |
| 9,432,298 | B1 | 8/2016 | Smith |
| 9,558,143 | B2 | 1/2017 | Leidel |
| 9,832,006 | B1 | 11/2017 | Bandi |
| 9,842,784 | B2 | 12/2017 | Nasrullah |
| 9,843,538 | B2 * | 12/2017 | Woodruff ............ H04L 45/745 |
| 9,886,275 | B1 | 2/2018 | Carlson |
| 9,934,842 | B2 * | 4/2018 | Mozak ............... G06F 13/1689 |
| 9,961,812 | B2 | 5/2018 | Suorsa |
| 9,977,731 | B2 | 5/2018 | Pyeon |
| 10,171,115 | B1 | 1/2019 | Shirinfar |
| 10,402,363 | B2 | 9/2019 | Long et al. |
| 10,410,694 | B1 | 9/2019 | Arbel |
| 10,439,661 | B1 | 10/2019 | Heydari |
| 10,642,767 | B1 | 5/2020 | Farjadrad |
| 10,678,738 | B2 | 6/2020 | Dai |
| 10,735,176 | B1 | 8/2020 | Heydari |
| 10,748,852 | B1 | 8/2020 | Sauter |
| 10,769,073 | B2 * | 9/2020 | Desai .................. G06F 13/1684 |
| 10,803,548 | B2 | 10/2020 | Matam et al. |
| 10,804,204 | B2 | 10/2020 | Rubin et al. |
| 10,825,496 | B2 | 11/2020 | Murphy |
| 10,826,536 | B1 * | 11/2020 | Beukema ............. H03M 13/19 |
| 10,855,498 | B1 | 12/2020 | Farjadrad |
| 10,935,593 | B2 | 3/2021 | Goyal |
| 11,088,876 | B1 | 8/2021 | Farjadrad |
| 11,100,028 | B1 | 8/2021 | Subramaniam |
| 11,164,817 | B2 | 11/2021 | Rubin et al. |
| 11,204,863 | B2 | 12/2021 | Sheffler |
| 11,581,282 | B2 | 2/2023 | Elshirbini |
| 11,669,474 | B1 | 6/2023 | Lee |
| 11,789,649 | B2 | 10/2023 | Chatterjee et al. |
| 11,841,815 | B1 | 12/2023 | Farjadrad |
| 11,842,986 | B1 | 12/2023 | Farjadrad |
| 11,855,043 | B1 | 12/2023 | Farjadrad |
| 11,855,056 | B1 | 12/2023 | Rad |
| 11,892,242 | B2 | 2/2024 | Mao |
| 11,893,242 | B1 | 2/2024 | Farjadrad |
| 11,983,125 | B1 | 5/2024 | Soni |
| 12,001,355 | B1 | 6/2024 | Dreier |
| 2002/0122479 | A1 | 9/2002 | Agazzi |
| 2002/0136315 | A1 | 9/2002 | Chan |
| 2004/0088444 | A1 | 5/2004 | Baumer |
| 2004/0113239 | A1 | 6/2004 | Prokofiev |
| 2004/0130347 | A1 | 7/2004 | Moll |
| 2004/0156461 | A1 | 8/2004 | Agazzi |
| 2005/0041683 | A1 | 2/2005 | Kizer |
| 2005/0134306 | A1 | 6/2005 | Stojanovic |
| 2005/0157781 | A1 | 7/2005 | Ho |
| 2005/0205983 | A1 | 9/2005 | Origasa |
| 2006/0060376 | A1 | 3/2006 | Yoon |
| 2006/0103011 | A1 | 5/2006 | Andry |
| 2006/0158229 | A1 | 7/2006 | Hsu |
| 2006/0181283 | A1 | 8/2006 | Wajcer |
| 2006/0188043 | A1 | 8/2006 | Zerbe |
| 2006/0250985 | A1 | 11/2006 | Baumer |
| 2006/0251194 | A1 | 11/2006 | Bublil |
| 2007/0281643 | A1 | 12/2007 | Kawai |
| 2008/0063395 | A1 | 3/2008 | Royle |
| 2008/0143422 | A1 | 6/2008 | Lalithambika |
| 2008/0186987 | A1 | 8/2008 | Baumer |
| 2008/0222407 | A1 | 9/2008 | Carpenter |
| 2009/0113158 | A1 | 4/2009 | Schnell |
| 2009/0154365 | A1 | 6/2009 | Diab |
| 2009/0174448 | A1 | 7/2009 | Zabinski |
| 2009/0220240 | A1 | 9/2009 | Abhari |
| 2009/0225900 | A1 | 9/2009 | Yamaguchi |
| 2009/0304054 | A1 | 12/2009 | Tonietto |
| 2010/0177841 | A1 | 7/2010 | Yoon |
| 2010/0197231 | A1 | 8/2010 | Kenington |
| 2010/0294547 | A1 | 11/2010 | Hatanaka |
| 2011/0029803 | A1 | 2/2011 | Redman-White |
| 2011/0038286 | A1 | 2/2011 | Ta |
| 2011/0167297 | A1 | 7/2011 | Su |
| 2011/0187430 | A1 | 8/2011 | Tang |
| 2011/0204428 | A1 | 8/2011 | Erickson |
| 2011/0267073 | A1 | 11/2011 | Chengson |
| 2011/0293041 | A1 | 12/2011 | Luo |
| 2012/0082194 | A1 | 4/2012 | Tam |
| 2012/0182776 | A1 | 7/2012 | Best |
| 2012/0192023 | A1 | 7/2012 | Lee |
| 2012/0216084 | A1 | 8/2012 | Chun |
| 2012/0327818 | A1 | 12/2012 | Takatori |
| 2013/0181257 | A1 | 7/2013 | Ngai |
| 2013/0222026 | A1 | 8/2013 | Havens |
| 2013/0249290 | A1 | 9/2013 | Buonpane |
| 2013/0285584 | A1 | 10/2013 | Kim |
| 2014/0016524 | A1 | 1/2014 | Choi |
| 2014/0048947 | A1 | 2/2014 | Lee |
| 2014/0126613 | A1 | 5/2014 | Zhang |
| 2014/0192583 | A1 | 7/2014 | Rajan |
| 2014/0269860 | A1 | 9/2014 | Brown |
| 2014/0269983 | A1 | 9/2014 | Baeckler |
| 2015/0012677 | A1 | 1/2015 | Nagarajan |
| 2015/0172040 | A1 | 6/2015 | Pelekhaty |
| 2015/0180760 | A1 | 6/2015 | Rickard |
| 2015/0206867 | A1 | 7/2015 | Lim |
| 2015/0271074 | A1 | 9/2015 | Hirth |
| 2015/0326348 | A1 | 11/2015 | Shen |
| 2015/0358005 | A1 | 12/2015 | Chen |
| 2016/0056125 | A1 | 2/2016 | Pan |
| 2016/0071818 | A1 | 3/2016 | Wang |
| 2016/0111406 | A1 | 4/2016 | Mak |
| 2016/0217872 | A1 | 7/2016 | Hossain |
| 2016/0294585 | A1 | 10/2016 | Rahman |
| 2017/0317859 | A1 | 11/2017 | Hormati |
| 2017/0331651 | A1 | 11/2017 | Suzuki |
| 2018/0010329 | A1 | 1/2018 | Golding, Jr. |
| 2018/0082981 | A1 | 3/2018 | Gowda |
| 2018/0137005 | A1 * | 5/2018 | Wu ......................... G11C 7/10 |
| 2018/0175001 | A1 | 6/2018 | Pyo |
| 2018/0190635 | A1 | 7/2018 | Choi |
| 2018/0210830 | A1 | 7/2018 | Malladi et al. |
| 2018/0315735 | A1 | 11/2018 | Delacruz |
| 2019/0044764 | A1 | 2/2019 | Hollis |
| 2019/0058457 | A1 | 2/2019 | Ran |
| 2019/0108111 | A1 | 4/2019 | Levin |
| 2019/0198489 | A1 | 6/2019 | Kim |
| 2019/0319626 | A1 | 10/2019 | Dabral |
| 2020/0051961 | A1 | 2/2020 | Rickard |
| 2020/0105718 | A1 | 4/2020 | Collins et al. |
| 2020/0257619 | A1 | 8/2020 | Sheffler |
| 2020/0373286 | A1 | 11/2020 | Dennis |
| 2021/0056058 | A1 | 2/2021 | Lee |
| 2021/0082875 | A1 | 3/2021 | Nelson |

(56) References Cited

U.S. PATENT DOCUMENTS

| | | | |
|---|---|---|---|
| 2021/0117102 | A1 | 4/2021 | Grenier |
| 2021/0149763 | A1* | 5/2021 | Ranganathan ...... G06F 11/1064 |
| 2021/0181974 | A1 | 6/2021 | Ghosh |
| 2021/0183842 | A1 | 6/2021 | Fay |
| 2021/0193567 | A1 | 6/2021 | Cheah et al. |
| 2021/0225827 | A1 | 7/2021 | Lanka |
| 2021/0258078 | A1 | 8/2021 | Meade |
| 2021/0311900 | A1 | 10/2021 | Malladi |
| 2021/0365203 | A1 | 11/2021 | O |
| 2022/0051989 | A1 | 2/2022 | Agarwal |
| 2022/0121381 | A1 | 4/2022 | Brewer |
| 2022/0159860 | A1 | 5/2022 | Winzer |
| 2022/0179792 | A1 | 6/2022 | Banerjee |
| 2022/0222198 | A1 | 7/2022 | Lanka |
| 2022/0223522 | A1 | 7/2022 | Scearce |
| 2022/0237138 | A1 | 7/2022 | Lanka |
| 2022/0254390 | A1* | 8/2022 | Gans ...................... H03K 19/20 |
| 2022/0327276 | A1 | 10/2022 | Seshan |
| 2022/0334995 | A1 | 10/2022 | Das Sharma |
| 2022/0342840 | A1 | 10/2022 | Das Sharma |
| 2023/0039033 | A1 | 2/2023 | Zarkovsky |
| 2023/0068802 | A1 | 3/2023 | Wang |
| 2023/0090061 | A1 | 3/2023 | Zarkovsky |
| 2023/0181599 | A1 | 5/2023 | Erickson |
| 2023/0359579 | A1 | 11/2023 | Madhira |
| 2024/0273041 | A1 | 8/2024 | Lee |

OTHER PUBLICATIONS

Universal Chiplet Interconnect Express (UCle) Specification Rev. 1.0, Feb. 24, 2022.
U.S. Appl. No. 16/812,234; Mohsen F. Rad; filed Mar. 6, 2020.
Kurt Lender et al., "Questions from the Compute Express Link Exploring Coherent Memory and Innovative Cases Webinar", Apr. 13, 2020, CXL Consortium, pp. 1-6.
Planet Analog, "The basics of SerDes (serializers/deserializers) for interfacing", Dec. 1, 2020, Planet Analog, as preserved by the internet Archive, pp. 1-9.
Block Memory Generator v8.2 LogiCORE IP Product Guide Vivado Design Suite; Xilinx; Apr. 1, 2015.
Kurt Lender et al., "Questions from the Compute Express Link Exploring Coherent Memory and Innovative Cases Webinar", Apr. 13, 2020, CXL consortium.
Planet Analog, "The basics of SerDes (serializers/deserializers) for interfacing", Dec. 1, 2020, Planet Analog.
"Hot Chips 2017: Intel Deep Dives Into EMIB", TomsHardware.com; Aug. 25, 2017.
"Using Chiplet Encapsulation Technology to Achieve Processing-In-Memory Functions"; Micromachines 2022, 13, 1790; https://www.mdpi.com/journal/micromachines; Tian et al.
"Multiport memory for high-speed interprocessor communication in MultiCom;" Scientia Iranica, vol. 8, No. 4, pp. 322-331; Sharif University of Technology, Oct. 2001; Asgari et al.
Universal Chiplet Interconnect Express (UCIe) Specification, Revision 1.1, Version 1.0, Jul. 10, 2023.
Hybrid Memory Cube Specification 2.1, Hybrid Memory Cube Consortium, HMC-30G-VSR PHY, 2014.
"Using Dual Port Memory as Interconnect", EE Times, Apr. 26, 2005, Daniel Barry.
Quartus II Handbook Version 9.0 vol. 4: SOPC Builder; "System Interconnect Fabric for Memory-Mapped Interfaces"; Mar. 2009.

* cited by examiner

MULTI-CHIP MODULE (MCM) WITH SCALABLE HIGH BANDWIDTH MEMORY

CROSS-REFERENCE TO RELATED APPLICATIONS

This application is a Non-Provisional which claims priority to U.S. Provisional Application No. 63/471,234, filed Jun. 5, 2023, titled HBM3 TO HBM4 MIGRATION METHOD, which is incorporated herein by reference in its entirety.

TECHNICAL FIELD

The disclosure herein relates to semiconductor devices, packaging and associated methods.

BACKGROUND

As integrated circuit (IC) chips such as system on chips (SoCs) become larger, the yields realized in manufacturing the chips become smaller. Decreasing yields for larger chips increases overall costs for chip manufacturers. To address the yield problem, chiplet architectures have been proposed that favor a modular approach to SoCs. The solution employs smaller sub-processing chips, each containing a well-defined subset of functionality. Chiplets thus allow for dividing a complex design, such as a high-end processor or networking chip, into several small die instead of one large monolithic die.

One form of memory technology that is employed in certain chiplet-based SoC applications is High Bandwidth Memory (HBM), which has multiple generations that have been standardized by the Joint Electron Device Engineering Council (JEDEC). Each iteration of the standard often involves significant industry investment in packaging infrastructure to support increased channel count, bandwidth, and performance. Transitioning from a legacy HBM standard to a next generation standard may also prove problematic due to uncertain scheduling for the production of new memory technology, often resulting in device availability being relegated to lower frequency bins for indeterminate periods of time. Thus, migrating from one HBM standard to a next generation HBM standard in a chiplet-based multi-chip module (MCM) is typically a costly endeavor.

What is needed is an efficient, robust and cost-efficient way to incorporate next-generation HBM devices into a chiplet architecture.

BRIEF DESCRIPTION OF THE DRAWINGS

Embodiments of the disclosure are illustrated by way of example, and not by way of limitation, in the figures of the accompanying drawings and in which like reference numerals refer to similar elements and in which.

DETAILED DESCRIPTION

Semiconductor devices, packaging architectures and associated methods are disclosed. In one embodiment, a multi-chip module (MCM) is disclosed that includes a package substrate and an integrated circuit (IC) processor chip disposed on the package substrate. The IC processor chip includes a data interface configured to support N channels. A scalable high bandwidth memory (HBM) is coupled to the IC processor chip. The scalable HBM includes a first HBM device disposed on the package substrate with a first primary data interface that supports a first set of N/2 data channels and a first data transfer rate. A second HBM device is disposed on the package substrate and supports a second set of N/2 data channels and a second data transfer rate. The first HBM device and the second HBM device are configured to collectively support the full N channels and an aggregate data rate that is a sum of the first data rate and the second data rate. By incorporating a scalable HBM memory with individual devices that support less than the total number of desired channels, legacy devices may be employed and configured to collectively provide the total number of desired channels. This may allow for a less-costly migration between the use of legacy HBM devices and next generation HBM devices.

Figure 1:
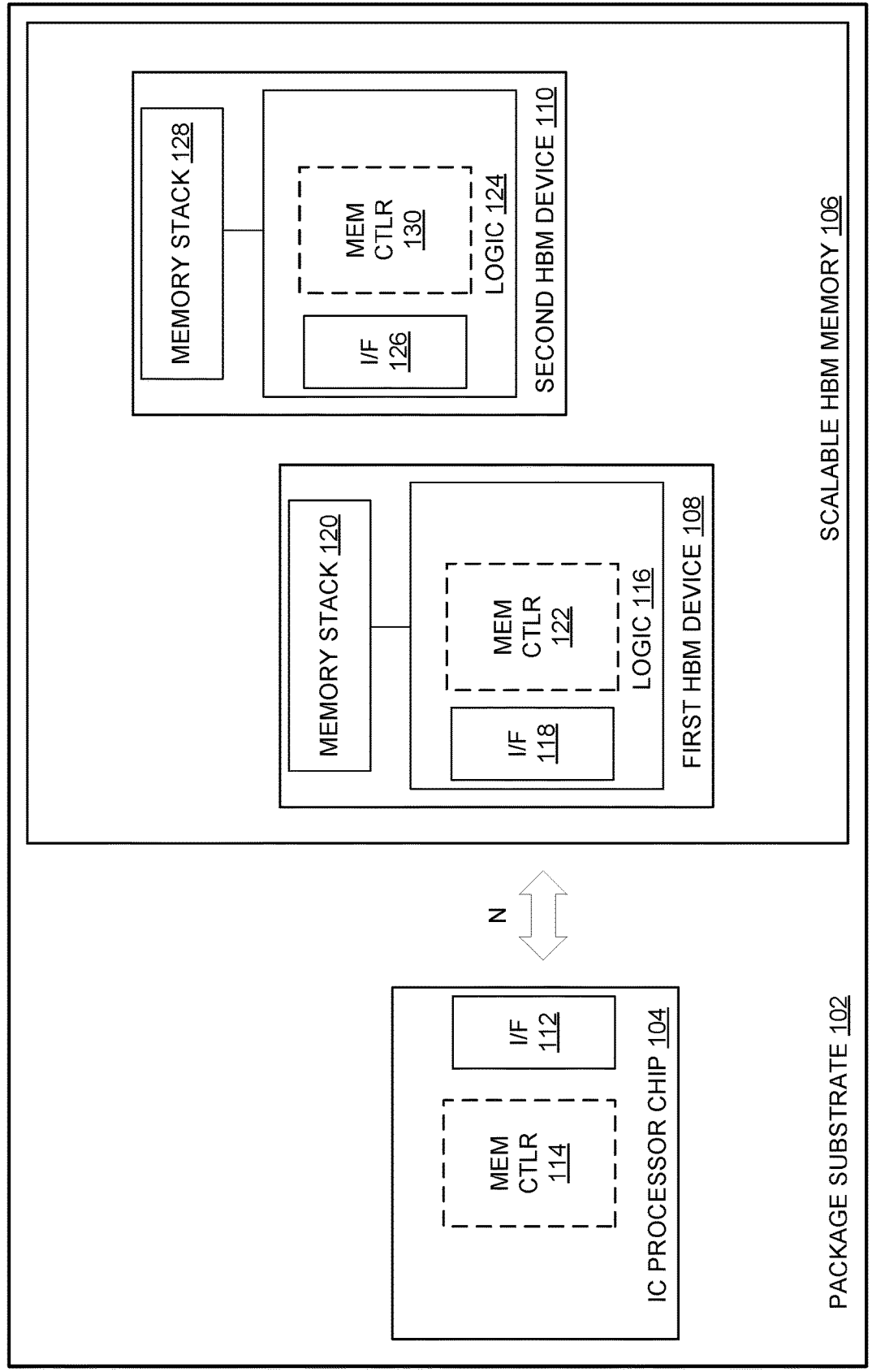
FIG. 1 illustrates a high-level generic embodiment of an MCM that employs a scalable HBM memory suitable for HBM device migration between device generations.

Throughout the disclosure provided herein, the term multi-chip module (MCM) is used to represent a semiconductor device that incorporates multiple semiconductor die or sub-packages in a single unitary package. An MCM may also be referred to as a system in a chip (SiP). With reference to FIG. 1, a block diagram of one embodiment of a multi-chip module (MCM) is shown, generally designated 100. For one embodiment, the MCM 100 includes a package substrate 102. The package substrate forms a support surface and signal routing vehicle for multiple integrated circuit (IC) chips, or chiplets, including an IC processor chip 104, and a scalable high bandwidth memory (HBM) 106. For one embodiment, the scalable HBM memory 106 includes at least a first high-bandwidth memory (HBM) device 108 and a second HBM device 110. Depending on the application, the package substrate 102 may take on one of various forms that more fully described below, such as a low-cost non-silicon substrate, a passive interposer or an active silicon interposer, a silicon bridge, or combination of forms, to name but a few.

With continued reference to FIG. 1, for one embodiment, the IC processor chip 104 takes the form of a computing resource such as a computer processing unit (CPU), graphics processing unit (GPU), or artificial intelligence processing unit. The IC processor chip 104 acts as a host device that periodically accesses the memory resources provided by the scalable HBM 106. A host memory interface 112 is provided on the IC processor chip 104 that supports a set of N independent channels. For one specific embodiment, the host memory interface 112 includes input/output (I/O) circuitry resources that are sufficient to form a set of thirty-two independent memory channels that operate at a collective data rate or bandwidth (BW). The host memory interface 112 also includes a communications interface that defines a host node for communicating with similar circuitry on the first and second HBM devices 108 and 110. For some embodiments, the IC processor chip 104 includes an HBM memory controller 114 to control transfers between core circuitry of the IC processor chip 104 and the scalable HBM memory 106. In other embodiments, the IC processor chip 104 may omit an HBM memory controller, with such functionality being incorporated into the HBM devices 108 and 110 of the scalable HBM memory 106.

Further referring to FIG. 1, for one embodiment, the first HBM device 108 takes the form of a DRAM memory device compliant with a given High Bandwidth Memory (HBM) standard, such as HBM3. The first HBM device 108 includes HBM logic 116 that may take the form of a logic base die or a portion of an active silicon substrate, such as that described more fully below with respect to FIG. 7. Depending on the topology employed by the scalable HBM memory 106, the HBM logic 116 includes a device memory interface 118 that includes device I/O circuitry that interfaces with at least a subset, such as N/2, of the set of the N memory channels provided by the host memory interface 112, and operating at a collective bandwidth of BW/2. Different topologies that incorporate different device interfaces are described more fully below. A stack of dynamic random access memory (DRAM) die 120 is vertically disposed on the HBM logic 116 and interconnected to the logic by, for example, through-silicon vias (TSVs). For embodiments where the IC processor chip 104 omits an HBM memory controller, the HBM logic 116 of the first HBM device 108 may also optionally include an on-chip HBM memory controller 122 to control transfers between the core circuitry of the IC processor chip 104 and the stack of DRAM die 120 of the first HBM device 108.

With continued reference to FIG. 1, the second HBM device 110 is formed similar to the first HBM device 108, including HBM logic 124 that may take the form of a second logic die or a second portion of an active silicon substrate, described more fully below. The HBM logic 124 includes a second device memory interface 126 that includes device I/O circuitry that interfaces with at least a second subset, such as N/2, of the set of the N memory channels provided by the host memory interface 112, and also operating at a collective bandwidth of BW/2. A second stack of dynamic random access memory (DRAM) die 128 is vertically disposed on and interconnected to the HBM logic 124. For embodiments where the IC processor chip 104 omits an HBM memory controller, the HBM logic 124 of the second HBM device 110 may also optionally include an on-chip HBM memory controller 130 to control transfers between the core circuitry of the IC processor chip 104 and the second stack of DRAM die 128 of the second HBM device 110.

Further referring to FIG. 1, the scalable HBM memory 106 may be configured in a variety of ways to suit various applications. Various embodiments for different topologies, such as daisy-chained and point-to-point architectures are described below and shown in FIGS. 2 through 7. At a high level, the first HBM device 108 and the second HBM device 110 are configured to collectively support the N independent channels and an aggregate data rate or bandwidth BW that matches the bandwidth provided by the HBM host memory interface 112. As a result, infrastructure for a next-generation HBM device that may incorporate an integer multiple number of channels and a similar expansion of memory bandwidth over a legacy HBM device may be developed and used with a unique configuration of multiple legacy HBM devices.

Figure 2:
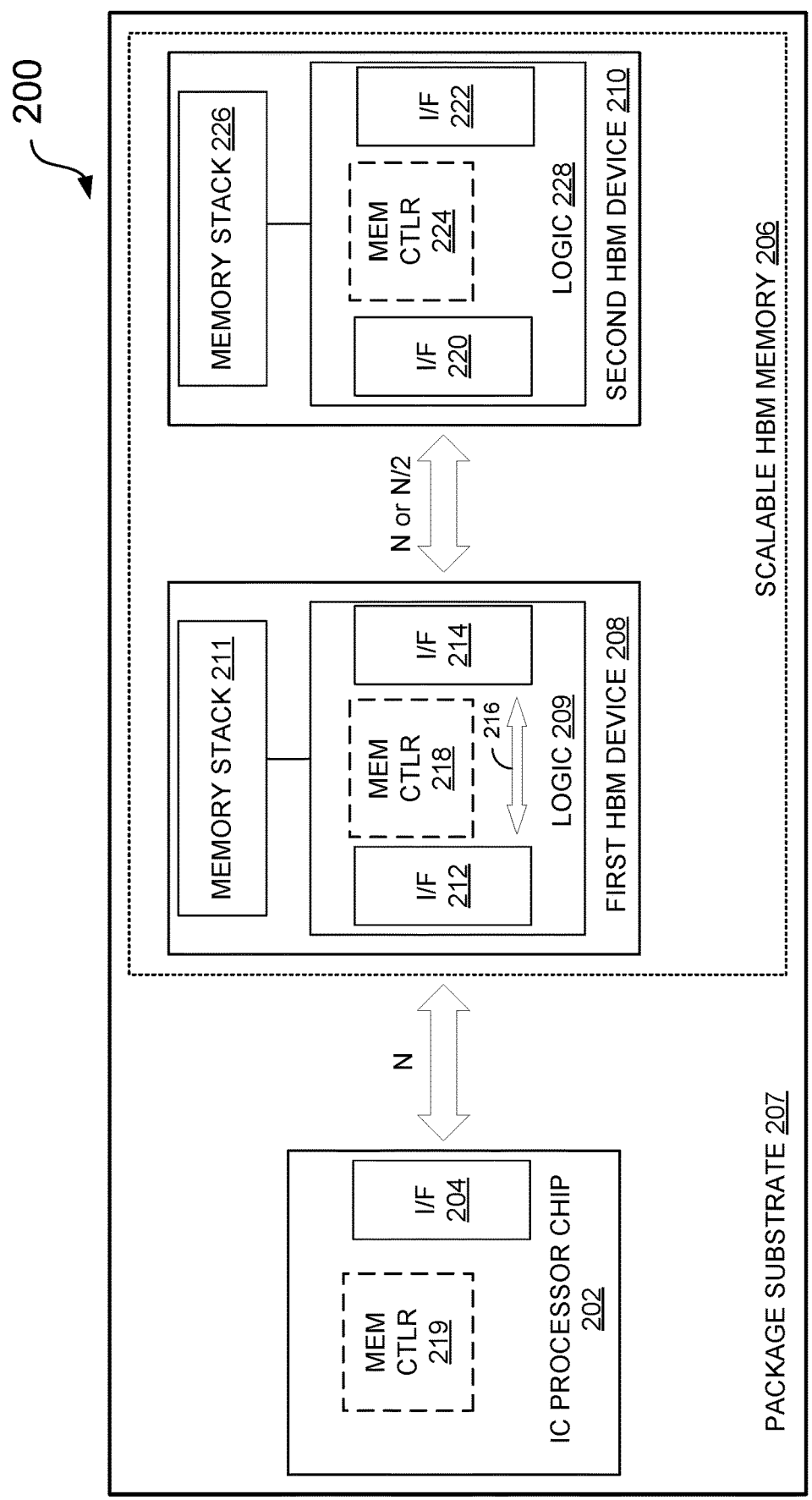
FIG. 2 illustrates one specific embodiment of the MCM of FIG. 1, employing a daisy-chained architecture.

While FIG. 1 illustrates a generic architecture for an HBM migration scheme, FIG. 2 illustrates one specific embodiment of the generic architecture by incorporating a daisy-chained topology for an MCM 200 using HBM memory devices similar to those described above. The MCM 200 includes an IC processor chip 202 that includes a host memory interface 204 that supports N channels and exhibits a collective bandwidth BW. A scalable HBM memory 206 is coupled to the IC processor chip 202 and provides respective first and second HBM devices 208 and 210 that are configured to be accessed, and where all memory-related signals to and from the second HBM device 210 run through and are retransmitted by the first HBM device 208. Each memory transaction (read or write) from the IC processor chip 202 is bound for one memory array on one of die memory stacks. If the first HBM device 208 determines the transaction is bound for its memory stack, it need not forward the transaction to the second HBM device 210.

With continued reference to FIG. 2, the IC processor chip 202 and the first and second HBM devices 208 and 210 of the scalable HBM memory 206 may be disposed on a package substrate 207 that takes one of a variety of forms, depending on the application. As one example, the various chips may be mounted on a low-cost non-silicon substrate, a passive interposer, an active silicon interposer, a silicon bridge, or combination of the above.

Further referring to FIG. 2, for one embodiment, the first HBM device 208 includes logic 209 in the form of an HBM base die that is stacked with a plurality of DRAM die 211. The logic 209 employs a first primary device interface 212 that matches the channel count N of the host memory interface 204 of the IC processor chip 202. For one specific embodiment that uses legacy HBM devices in the scalable HBM memory 206, an integer number of legacy HBM device interface circuits, each supporting N/2 channels, may be combined or unified to form the primary device interface 212 for the first HBM device 208 to support the N channels.

With continued reference to FIG. 2, to communicate with the second HBM device 210, the first HBM device 208 employs a second port or secondary device interface 214 that may, as an example, support N or N/2 channels, depending on the application. Communications circuitry 216, forming a portion of the overall switch fabric employed throughout the MCM 200, interconnects the secondary device interface 214 to at least a portion of the primary device interface 212. For one embodiment, the communications circuitry 216 may employ multiplexing circuitry to select which portions of the N channels are passed to and from the first HBM device 208 and the second HBM device 210. In other situations, the communications circuitry 216 may take the form of in-memory processing circuitry, similar to network-on-chip (NoC) circuitry discussed in U.S. patent application Ser. No. 17/994,123, titled "MULTI-CHIP MODULE (MCM) WITH MULTI-PORT UNIFIED MEMORY, filed Nov. 25, 2022, and incorporated by reference herein in its entirety.

In some embodiments, the first HBM device 208 includes a on-chip memory controller 218 that interacts with a portion of the primary device interface 212, such as a first set of N/2 channels, to facilitate transfers between the IC processor chip 202 and the stack of DRAM die 211. A second set of the N/2 channels bypasses the first on-chip memory controller 218 and is routed on-chip to the secondary device interface 214 via the communications circuitry 216. In some circumstances, the first on-chip memory controller 218 may be omitted from the first HBM device 208, and instead a host memory controller 219 may be incorporated on the IC processor chip 202. For some embodiments, where the memory controller is omitted from the first HBM device, buffer circuitry (not shown) may be provided.

Further referring to FIG. 2, the second HBM device 210 is formed similar to the first HBM device 208, such as a replica of the first HBM device, and includes a second logic base die 228 that incorporates a second primary interface 220, and an unused second secondary interface 222. For some embodiments, the second primary and secondary interfaces 220 and 222 may include circuitry to support a same number of channels as those supported by the first primary and secondary interface circuits 212 and 214 of the first HBM device 208. In other embodiments, the second primary and secondary interfaces 220 and 222 may include circuitry to support half the number of channels as those supported by the first primary and secondary interface circuits 212 and 214 of the first HBM device 208. Depending on the application, the second HBM device 210 may or may not include an on-chip memory controller, such as at 224 to facilitate transfers between the IC processor chip 202 and a second stack of DRAM die 226 that is stacked atop the second logic base die 228.

In operation, the MCM 200 provides the infrastructure and resources to support operating N independent memory channels with a scalable HBM memory that utilizes HBM devices that separately support N/2 channels, albeit in a daisy-chained architecture. One specific example involves providing a total of thirty-two channels—with sixteen of the channels provided by the first HBM device 208, and the other sixteen channels provided in a daisy-chained manner by the second HBM device 210 via the on-chip retransmitting/repeating feature provided by the first HBM device 208. Additionally, by coordinating memory accesses to the first and second HBM devices in a concurrent manner, where both of the HBM devices 208 and 210 are accessed during respective time intervals that at least partially overlap, the aggregate memory bandwidth of the scalable HBM memory 206 for the thirty-two channels may be doubled in comparison to what the bandwidth would be for sixteen channels.

Figure 3:
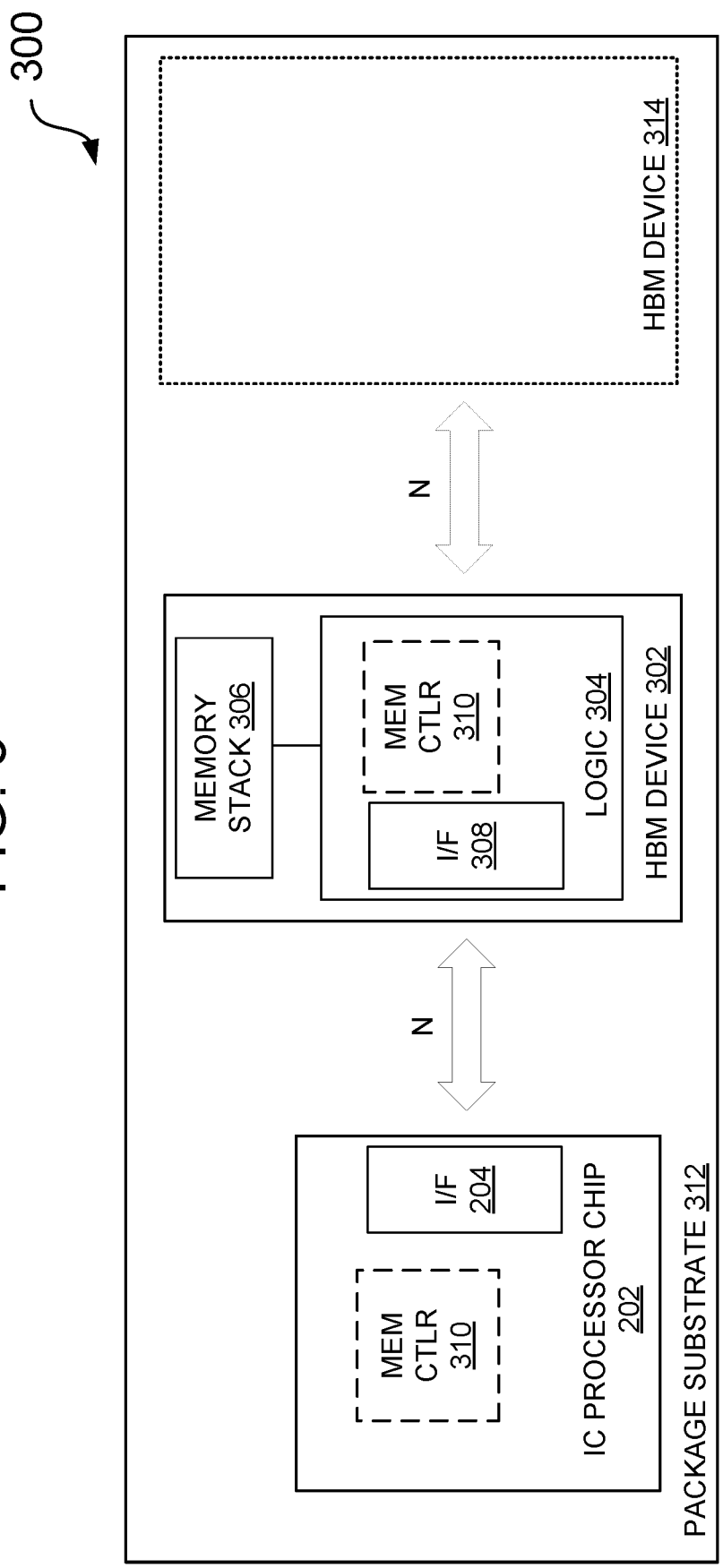
FIG. 3 illustrates an MCM with an IC processor device, such as that employed in FIG. 2, redeployed to support a next generation HBM device.

While FIG. 2 illustrates one embodiment of an MCM that utilizes a scalable HBM memory 206 that supports N channels in a legacy mode of operation using legacy devices, such as HBM3 devices, that each support N/2 channels, FIG. 3 illustrates an embodiment of an MCM 300 that supports a next generation mode of operation by reusing much of the infrastructure designed to support interoperability between, for example, the IC processor chip 202 and the scalable HBM memory 206 of FIG. 2. However, instead of employing the scalable HBM memory 206, a next generation HBM memory device 302 that individually supports N channels may be substituted as the HBM memory resource. The next generation HBM device 302 would be expected to be similar to prior generation devices, with a logic base die 304 that is coupled to a stack of memory die 306. The logic base die 304 would include a full N-channel device interface 308 to generally match the N-channel host interface 204 of the IC processor chip 202. A memory controller 1210 may optionally be included in the logic base die 304, unless it is incorporated in the IC processor chip 202. For some embodiments, additional capacity in the form of an additional next generation HBM device 314 may be provided in a daisy-chained manner, where the first HBM device 304 includes NoC circuitry to manage traffic between the two next generation HBM devices 302 and 314. The reused infrastructure and the additional capacity option may be employed in any of the MCM embodiments described herein, such as those shown in FIGS. 2, and 4-7.

Further referring to FIG. 3, the IC processor chip 202 may retain and reuse much of the infrastructure provided in supporting the legacy mode of operation, such as that shown in FIG. 2, thus reducing the costs and time typically involved in migrating from legacy memory devices to next generation devices. Programmable logic (not shown) in the IC processor chip 202 may be updated during MCM manufacture or during initialization to configure the IC processor chip 202 to operate in the legacy mode or the next generation mode. While the discussion above notes the reusability of a same IC processor chip 202 for both MCM embodiments 200 and 300, for some embodiments, the IC processor chip 202 employed in the MCM 300 may incorporate slight modifications that may be accomplished with far lower cost than a full redesign to support a next generation HBM architecture.

For some embodiments, the IC processor chip 202 employs unique interface circuitry that allows for the use of high-performance links that are compatible with a cost-efficient standard organic build-up package substrate, such as at 312. Such interface circuitry and associated links are disclosed in U.S. patent application Ser. No. 18/092,647, filed Jan. 3, 2023, titled "CHIPLET GEARBOX FOR LOW-COST MULTI-CHIP MODULE APPLICATIONS", and incorporated by reference in its entirety.

Figure 4:
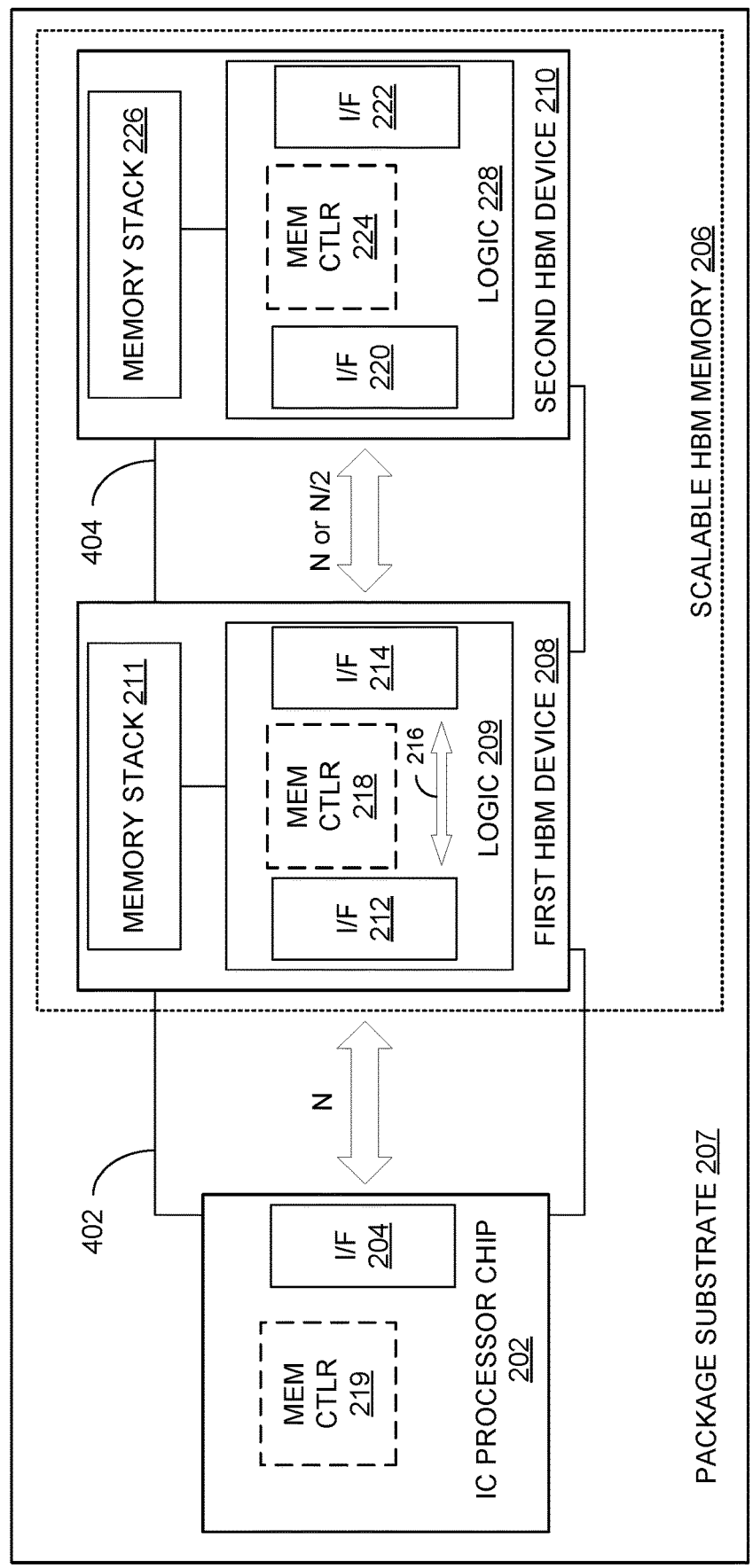
FIG. 4 illustrates an MCM architecture similar to that of FIG. 2, and employing embedded silicon bridges to interconnect various chips.

While the use of standard non-silicon substrates may be beneficial for certain applications, other applications may utilize interface circuitry and associated links that benefit from a silicon-based primary or secondary substrate that is more suitable for fine-pitch routing. FIG. 4 illustrates one embodiment of an MCM 400 that is similar to the MCM 300 of FIG. 2, but incorporating one or more embedded silicon bridges having multiple routing layers, such as first and second embedded multi-die interconnect bridges (EMIBs) 402 and 404. The first bridge 402 spans a first distance between the first IC processor chip 202 and the first HBM device 208 to connect interfaces 204 and 212, while the second bridge 404 spans at least the distance between the first HBM device 208 and the second HBM device 210 to connect interfaces 214 and 220. The use of bridges, instead of one large silicon interposer, enables a high-level of interconnect density where it is needed—between the respective interfaces of multiple chips. For some embodiments, the bridges 402 and 404 may be embedded in a package substrate 207 to reduce costs even further.

Figure 5:
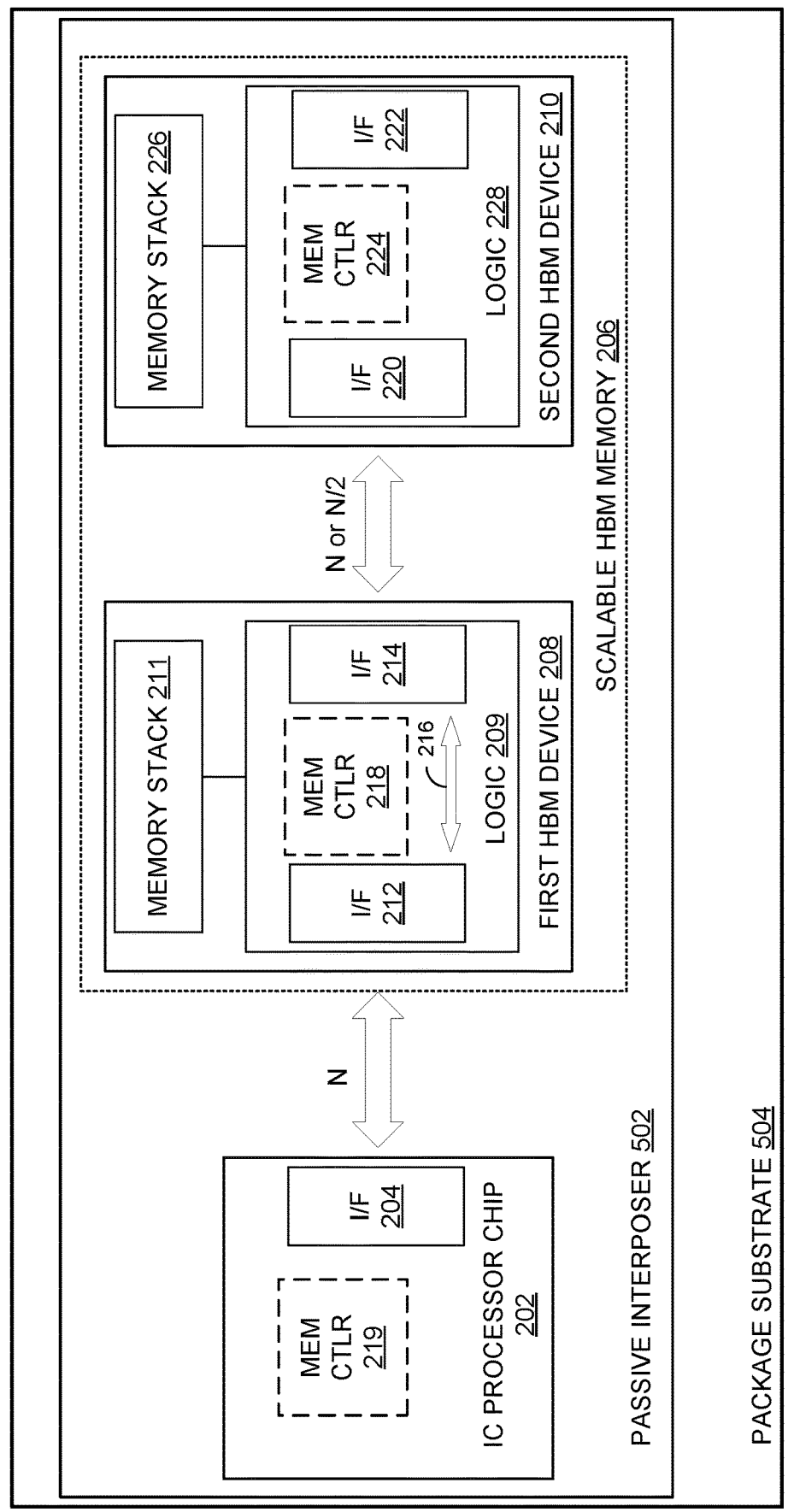
FIG. 5 illustrates an MCM architecture similar to that of FIG. 2, and employing a passive interposer to interconnect various chips.

FIG. 5 illustrates a further embodiment of an MCM 500 that is similar to the MCM 200 of FIG. 2 but incorporates a passive silicon interposer 502 that forms at least a portion of a package substrate 504. Unlike an active interposer, which includes active electronic circuitry, the passive silicon interposer 502 provides a silicon-based support structure formed with finely-pitched interconnect routing paths, and without active transistor circuitry. The use of such an interposer allows for chip contact pitch density for the chip interfaces to be on the order of approximately 30 to 70 micrometers.

Figure 6:
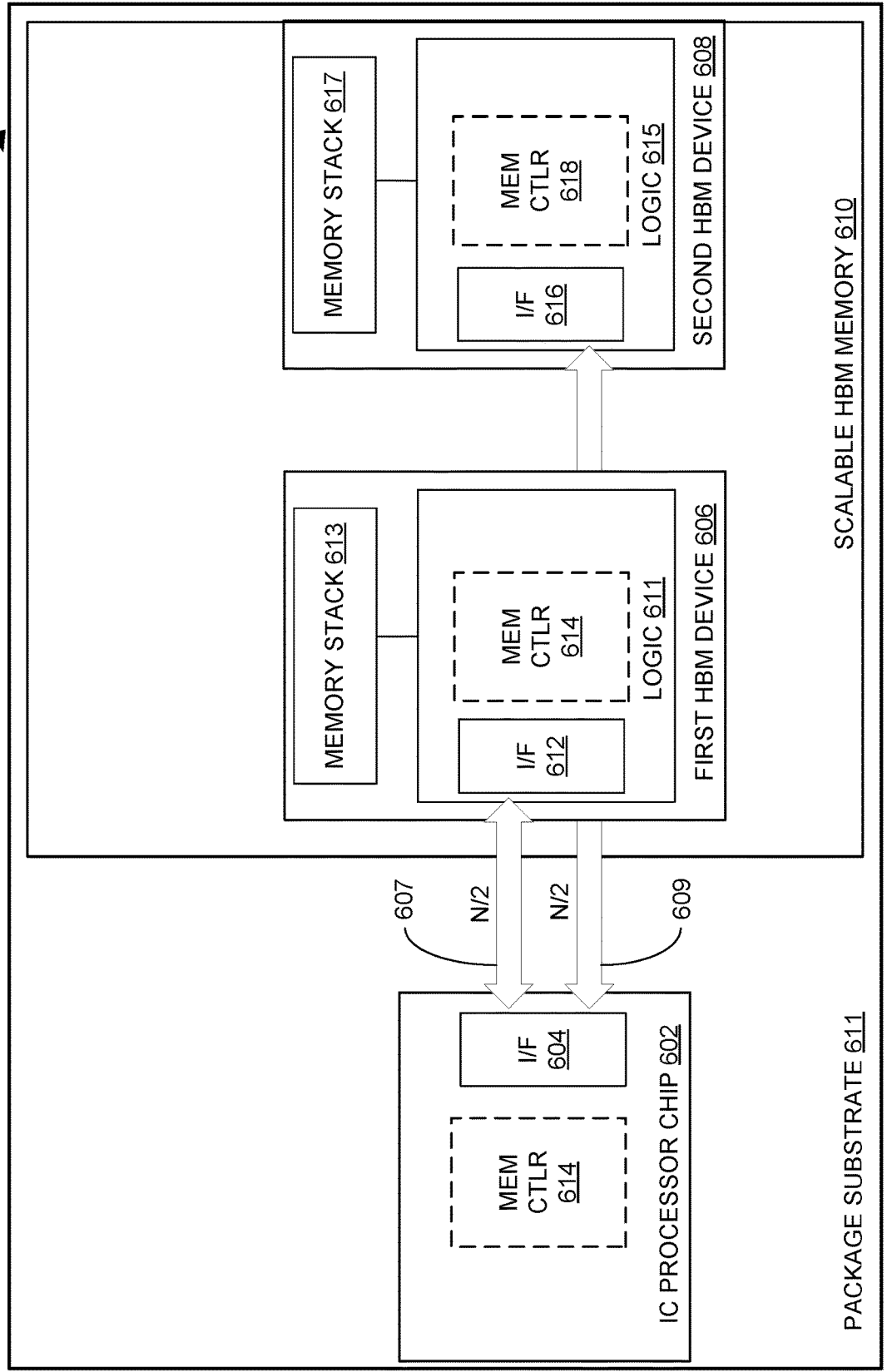
FIG. 6 illustrates another specific embodiment of the MCM of FIG. 1, employing a point-to-point architecture.

While the embodiments illustrated in FIGS. 2-5 illustrate the first and second HBM devices being coupled to the IC processor chip in a daisy-chained architecture, other embodiments may connect each HBM device directly to an IC processor chip in a point-to-point architecture. FIG. 6 illustrates an MCM 600 having an IC processor chip 602 with a host interface 604 formed to support N channels. A first portion of the host interface 604 is directly connected to a first HBM device 606 via a first set of N/2 point-to-point links 607. A second portion of the host interface 604 is directly connected to a second HBM device 608 via a second set of N/2 point-to-point links 609. For one embodiment, a portion of the second set of N/2 links 609 is routed beneath the first HBM device 606. Together, the first and second HBM devices 606 and 608 form a scalable HBM memory 610. In one embodiment, the IC processor chip 602, the first HBM device 606 and the second HBM device 608 are all mounted on a package substrate 611. For some embodiments, all or a portion of the package substrate 611 may be formed of an organic material. In other embodiments, all or a portion of the package substrate 611 may be formed of an active or passive silicon-based material, or include silicon bridge structures such as in FIG. 4.

Further referring to FIG. 6, for one embodiment the first HBM device 606 includes a first logic base die 611 having a first device interface 612 that is directly coupled to the first set of N/2 channels 607. In some embodiments, the first HBM device 606 may also include an on-chip memory controller 614, while in other embodiments the memory controller 614 is disposed in the IC processor chip 602 to control memory accesses for both HBM devices 606 and 608. The first logic base die couples to a first stack of memory chips 613. The second HBM device 608 is formed similar to the first HBM device 606, with a second logic base die 615 having a second device interface 616 that is directly coupled to the second set of N/2 channels 609. The second logic base die 615 couples to a second stack of memory chips 617. For situations where the memory controller 614 is omitted from the IC processor chip 602, the second HBM memory device 608 includes an on-chip memory controller 618 that processes transactions destined for the memory stack 617 associated with it, while the memory controller 614 of the first HBM device 606 processes transactions destined for the memory stack 613 of the first HBM device 606.

In operation, the MCM 600 provides the infrastructure and resources to support operating N independent memory channels with the scalable HBM memory 610 that utilizes HBM devices that separately support N/2 channels, albeit in a point-to-point architecture. One specific example involves providing a total of thirty-two channels—with sixteen of the channels provided by the first HBM device 606 via the first set of N/2 point-to-point links 607 with the IC processor chip 602, and the other sixteen channels provided in a point-to-point manner by the second HBM device 608 via the second set of point-to-point links 609. Additionally, by coordinating memory accesses to the first and second HBM devices 606 and 608 in a concurrent manner, where both of the HBM devices are accessed during respective time intervals that at least partially overlap, the aggregate memory bandwidth of the scalable HBM memory 610 for the thirty-two channels may be doubled in comparison to what the bandwidth would be for sixteen channels.

Figure 7:
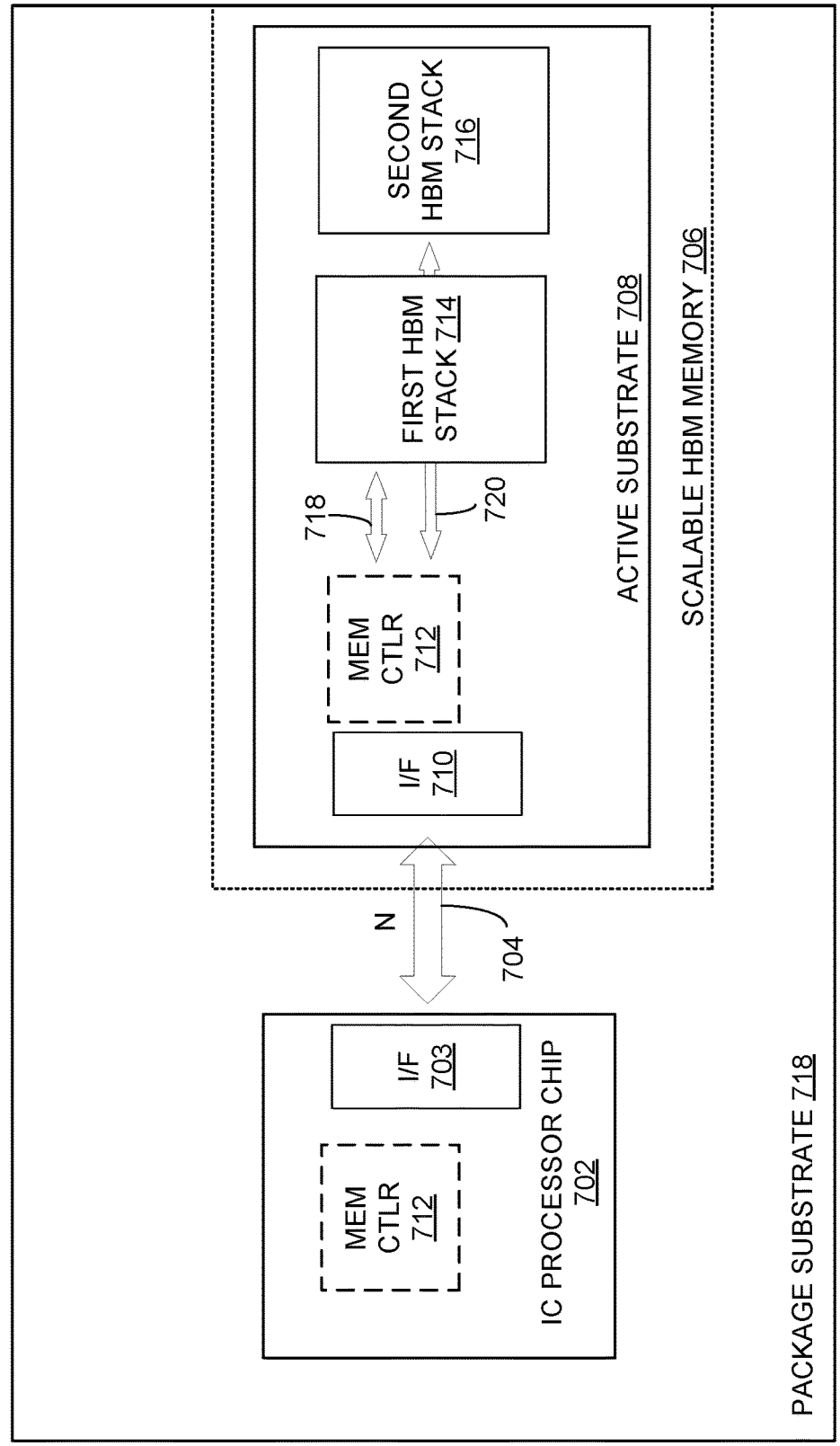
FIG. 7 illustrates an MCM architecture similar to that of FIG. 6, and employing an active interposer to interconnect various chips.

FIG. 7 illustrates a further embodiment for an MCM 700 that employs a point-to-point architecture. The MCM includes an IC processor chip 702 that incorporates a host interface 703 to support N channels. A full set of N links 704 connects the IC processor chip 702 to a scalable HBM memory 706. For one embodiment, the scalable HBM memory 706 includes an active silicon substrate 708 formed with a device interface 710 that supports N channels and which is connected to the N links 704. For one embodiment, a memory controller 712 is formed on the active substrate 708 to control a first HBM memory stack 714 and a second HBM memory stack 716. Like other embodiments described above, the memory controller 712 may instead be disposed on the IC processor chip 702. A first set of on-substrate routing paths 718 are formed on the active substrate 708 to connect either the device interface 710 (in the event the memory controller is employed on the IC processor chip 702), or the memory controller 712 to the first HBM memory stack 714 in a point-to-point manner. A second set of on-substrate routing paths 720 are formed on the active substrate 708 to connect either the device interface 710 (in the event the memory controller is employed on the IC processor chip 702), or the memory controller 712 to the second HBM memory stack 716 in a point-to-point manner.

Further referring to FIG. 7, the active silicon substrate 708 essentially functions as a joint HBM base die for the first and second HBM memory stacks 714 and 716. For some embodiments, the active silicon substrate 708 may form a secondary substrate for mounting the HBM memory stacks 714 and 716, and formed on or embedded in a larger primary substrate 718 that may be constructed of organic material or non-organic material.

When received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, component circuits or devices and the like may be different from those described above in alternative embodiments. Also, the interconnection between circuit elements or circuit blocks shown or described as multi-conductor signal links may alternatively be single-conductor signal links, and single conductor signal links may alternatively be multi-conductor signal links. Signals and signaling paths shown or described as being single-ended may also be differential, and vice-versa. Similarly, signals described or depicted as having active-high or active-low logic levels may have opposite logic levels in alternative embodiments. Component circuitry within integrated circuit devices may be implemented using metal oxide semiconductor (MOS) technology, bipolar technology or any other technology in which logical and analog circuits may be implemented. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '<signalname>') is also used to indicate an active low signal. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

We claim:

1. A chiplet-based multi-chip module (MCM), comprising:
    a package substrate comprising a base substrate, and an active base die formed on the base substrate, the active base die comprising active circuitry;
    an integrated circuit (IC) processor chiplet coupled to the package substrate, the IC processor chiplet comprising a data interface configured to couple to N channels;
    a scalable high bandwidth memory (HBM) coupled to the IC processor chiplet and comprising
        a first HBM device coupled to the active base die, the active base die comprising active circuitry comprising a first primary data interface to couple to the N channels, wherein the first HBM device is dedicated to a first subset the N channels and operative at a first data transfer rate, the first HBM device comprising a first stack of memory die;
        a second HBM device coupled to the active base die and dedicated to a second subset of the N channels and operative at a second data transfer rate, the second HBM device comprising a second stack of memory die separate from the first stack of memory die; and
        wherein the IC processor chiplet, the first HBM device and the second HBM device are placed in a row and the first HBM device is located between the IC processor chiplet and the second HBM device, and the first HBM device and the second HBM device are configured to collectively couple to the N channels and an aggregate data rate that is at most a sum of the first data transfer rate and the second data transfer rate.

2. The chiplet-based MCM of claim 1, further comprising: memory control circuitry coupled to the active base die.
3. The chiplet-based MCM of claim 1, wherein:
    the active base die comprises circuitry to couple to the N channels for controlling transactions between the IC processor chiplet and the respective first stack of memory die and the second stacks of memory die.
4. The chiplet-based MCM of claim 1, wherein:
    the package substrate comprises a base substrate, and at least one silicon bridge coupled to the base substrate to interconnect the IC processor chiplet with the first HBM device and the second HBM device.
5. The chiplet-based MCM of claim 1, wherein:
    the package substrate comprises an organic substrate.
6. The chiplet-based MCM of claim 1, further comprising:
    multiple bidirectional links coupling the IC processor chiplet to the scalable HBM.
7. The chiplet-based MCM of claim 3, wherein:
    the active base die comprises memory control circuitry.
8. An integrated circuit (IC) processor chiplet, comprising:
    a high bandwidth memory (HBM) data interface that is configurable to operate in one of a first HBM mode of operation or a second HBM mode of operation;
    wherein during the first HBM mode of operation, the HBM data interface is configured to couple to multiple links forming N channels and to operate at an aggregate data rate R, the multiple links to couple the IC processor chiplet to at least two DRAM stacks on an active base die, each of the at least two DRAM stacks configured to couple to N/2 channels; and
    wherein during the second HBM mode of operation, the HBM data interface is configured to couple to the multiple links forming the N channels and to operate at the aggregate data rate R, the multiple links to couple the IC processor chiplet to one of the at least two HBM stacks at a time, each of the at least two HBM stacks configured to couple to the N channels.
9. The IC processor chiplet of claim 8, wherein:
    the HBM data interface is configured to couple to the at least two HBM stacks via the multiple links in a daisy-chain architecture.
10. The IC processor chiplet of claim 8, wherein:
    the HBM data interface is configured to couple to the at least two HBM stacks via the multiple links in a point-to-point architecture.
11. The IC processor chiplet of claim 8, wherein:
    the high bandwidth memory (HBM) data interface comprises input/output (I/O) circuitry to couple to the multiple links forming the N channels, the I/O circuitry comprising simultaneous bidirectional transceiver circuitry to transfer data along the N channels.
12. A scalable high-bandwidth memory (HBM), comprising:
    a first HBM device coupled to an active base die that comprises active circuitry and comprising a first primary data interface to couple to an integrated circuit (IC) processor chiplet, the first primary data interface to couple to a first set of at least N/2 data channels and to operate at a first data transfer rate, the first HBM device comprising a first stack of memory die;
    a second HBM device coupled to the active base die and supporting a second set of at least N/2 data channels and to operate at a second data transfer rate, the second HBM device comprising a second stack of memory die that is separate from the first stack of memory die; and wherein the first HBM device and the second HBM device are configured to collectively couple to N channels and to operate at an aggregate data rate that is at most a sum of the first data transfer rate and the second data transfer rate.

13. The scalable HBM memory of claim 12, further comprising:
    a first memory control circuit disposed in the first HBM device; and
    a second memory control circuit disposed in the second HBM device.

14. The chiplet-based MCM of claim 1, wherein the active base die further comprises:
    active base die circuitry to control transactions between the IC processor chiplet and the respective first stack of memory die and the second stack of memory die, the active base die circuitry comprising a device data interface that is coupled to the data interface of the IC processor chiplet, the device data interface configured to couple to the N channels.

15. The chiplet-based MCM of claim 14, wherein:
    the first HBM device, the second HBM device, and the device data interface are positioned on the active base die circuitry in a row.

16. The chiplet-based MCM of claim 1, wherein:
    the package substrate comprises a base substrate and at least one silicon bridge formed on the base substrate to interconnect the IC processor chiplet with the scalable high bandwidth memory (HBM).

17. The chiplet-based MCM of claim 1, wherein:
    the package substrate comprises a passive silicon substrate or silicon interposer.

18. The IC processor chiplet of claim 8, wherein:
    the HBM data interface is configured to couple to the at least two HBM stacks via an active base die.

* * * * *